United States Patent
Lyders et al.

(10) Patent No.: US 8,257,030 B2
(45) Date of Patent: Sep. 4, 2012

(54) GAS TURBINE ENGINE SYSTEMS INVOLVING FAIRINGS WITH LOCATING DATA

(75) Inventors: David R. Lyders, Middletown, CT (US); Carl Brian Klinetob, Manchester, CT (US); Phillip Alexander, Colchester, CT (US)

(73) Assignee: United Technologies Corporation, Hartford, CT (US)

(*) Notice: Subject to any disclaimer, the term of this patent is extended or adjusted under 35 U.S.C. 154(b) by 1468 days.

(21) Appl. No.: 12/050,238

(22) Filed: Mar. 18, 2008

(65) Prior Publication Data

US 2009/0238686 A1  Sep. 24, 2009

(51) Int. Cl.
*F03D 11/00* (2006.01)

(52) U.S. Cl. .......... 415/142; 415/191; 416/233

(58) Field of Classification Search .......... 415/119, 415/142, 191; 416/232, 233, 244 A, 500
See application file for complete search history.

(56) References Cited

U.S. PATENT DOCUMENTS

| | | | |
|---|---|---|---|
| 2,914,300 A | 11/1959 | Douglas | |
| 3,269,700 A | 8/1966 | Shainess | |
| 4,247,255 A * | 1/1981 | De Rosa | 416/141 |
| 4,832,568 A * | 5/1989 | Roth et al. | 415/189 |
| 4,946,346 A | 8/1990 | Ito | |
| 4,987,736 A | 1/1991 | Ciokajlo et al. | |
| 4,993,918 A | 2/1991 | Myers et al. | |
| 5,020,318 A | 6/1991 | Vdoviak | |
| 5,272,869 A | 12/1993 | Dawson et al. | |
| 5,943,856 A * | 8/1999 | Lillibridge et al. | 60/262 |
| 6,183,192 B1 | 2/2001 | Tressler et al. | |
| 6,792,758 B2 | 9/2004 | Dowman | |
| 6,884,030 B2 * | 4/2005 | Darkins et al. | 415/191 |
| 6,983,608 B2 | 1/2006 | Allen, Jr. et al. | |
| 7,100,358 B2 | 9/2006 | Gekht et al. | |
| 7,118,331 B2 | 10/2006 | Shahpar | |
| 7,137,255 B2 | 11/2006 | Schmotolocha et al. | |
| 2006/0260127 A1 | 11/2006 | Gekht et al. | |
| 2006/0269405 A1 * | 11/2006 | Euvino et al. | 415/208.1 |
| 2007/0116566 A1 | 5/2007 | Cunha et al. | |

\* cited by examiner

*Primary Examiner* — Edward Look
*Assistant Examiner* — Adam W Brown

(57) ABSTRACT

Gas turbine engine systems involving fairings with locating data are provided. In this regard, a representative a fairing assembly for a gas turbine engine includes: a first locating component having a leading edge, first and second sides extending from the leading edge, and a recess oriented parallel to the leading edge, the recess having a first datum surface, the first locating component being operative to be positioned between a portion of a strut and a portion of an interior surface of a fairing sheath such that the first datum surface establishes a desired orientation of the fairing sheath relative to the strut.

20 Claims, 2 Drawing Sheets

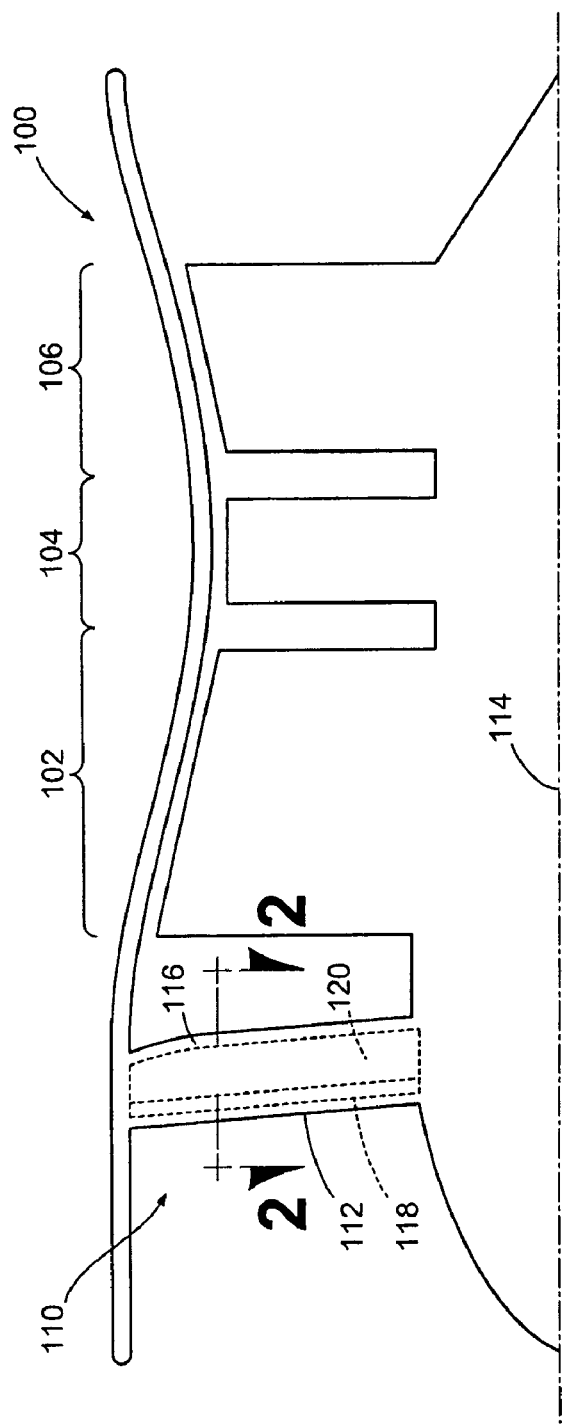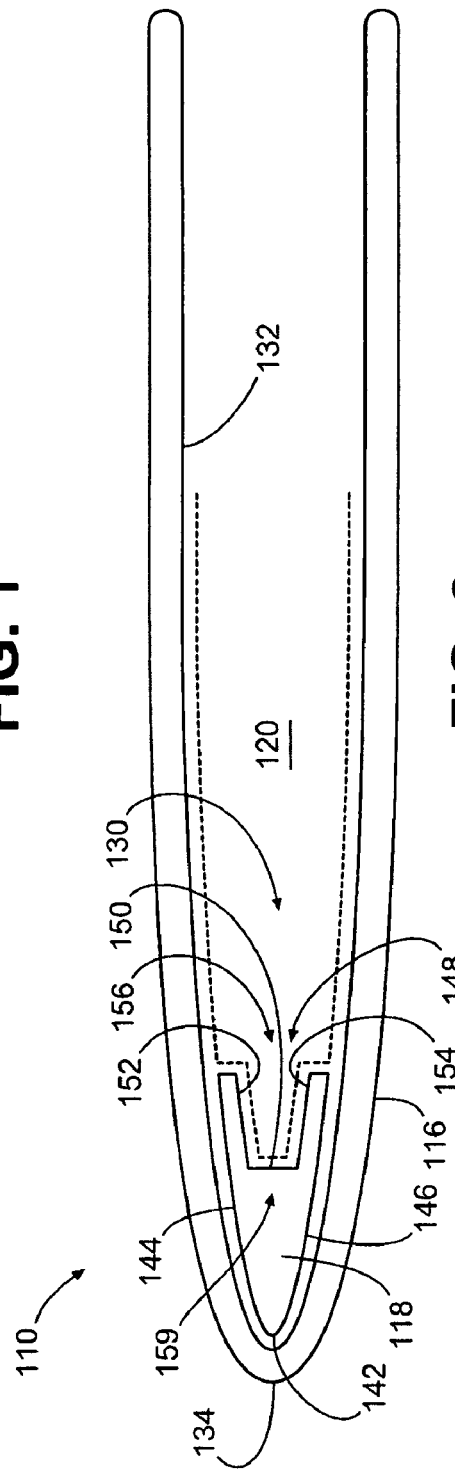

US 8,257,030 B2

GAS TURBINE ENGINE SYSTEMS INVOLVING FAIRINGS WITH LOCATING DATA

STATEMENT REGARDING FEDERALLY SPONSORED RESEARCH AND DEVELOPMENT

The U.S. Government may have an interest in the subject matter of this disclosure as provided for by the terms of contract number N00019-02-C-3003 awarded by the United States Navy.

BACKGROUND

1. Technical Field

The disclosure generally relates to gas turbine engines.

2. Description of the Related Art

A gas turbine engine typically includes an annular gas path that generally extends between an inlet and an exhaust. The structure used to define the gas path is oftentimes supported by struts and/or fairings that extend across the gas path, with corresponding ends of the struts and/or fairings typically supporting one or more rotating shafts of the engine and the opposing ends supporting the engine casing.

SUMMARY

Gas turbine engine systems involving fairings with locating data are provided. In this regard, an exemplary embodiment of a fairing assembly for a gas turbine engine comprises: a fairing sheath having an exterior surface and an interior surface, the exterior surface having a leading edge and being configured to form at least a portion of an exterior of the fairing, the interior surface defining a channel; a strut extending through the channel; and a first locating component having a first datum surface, the first locating component being located between a portion of the strut and a portion of the interior surface of the fairing sheath such that the first datum surface establishes a desired orientation of the fairing sheath relative to the strut.

An exemplary embodiment of a fairing assembly for a gas turbine engine comprises: a first locating component having a leading edge, first and second sides extending from the leading edge, and a recess oriented parallel to the leading edge, the recess having a first datum surface, the first locating component being formed of thermal plastic; the first locating component being operative to be positioned between a portion of a strut and a portion of an interior surface of a fairing sheath such that the first datum surface establishes a desired orientation of the fairing sheath relative to the strut.

An exemplary embodiment of a gas turbine engine comprises: a compressor; a combustion section located downstream of the compressor; a turbine operative to drive the compressor; and the fairing assembly having a fairing sheath, a strut and a first locating component; the fairing sheath having an exterior surface and an interior surface, the exterior surface having a leading edge and being configured to form at least a portion of an exterior of the fairing, the interior surface defining a channel; the strut extending through the channel; and the first locating component being located between a portion of the strut and a portion of the interior surface of the fairing sheath such that the first locating component establishes a desired orientation of the fairing sheath relative to the strut.

Other systems, methods, features and/or advantages of this disclosure will be or may become apparent to one with skill in the art upon examination of the following drawings and detailed description. It is intended that all such additional systems, methods, features and/or advantages be included within this description and be within the scope of the present disclosure.

BRIEF DESCRIPTION OF THE DRAWINGS

Many aspects of the disclosure can be better understood with reference to the following drawings. The components in the drawings are not necessarily to scale. Moreover, in the drawings, like reference numerals designate corresponding parts throughout the several views.

FIG. 1 is a schematic diagram depicting an exemplary embodiment of a gas turbine engine.

FIG. 2 is a cross-sectional, schematic diagram depicting the inlet fairing of FIG. 1, as viewed along section line 2-2.

DETAILED DESCRIPTION

Figure 3:
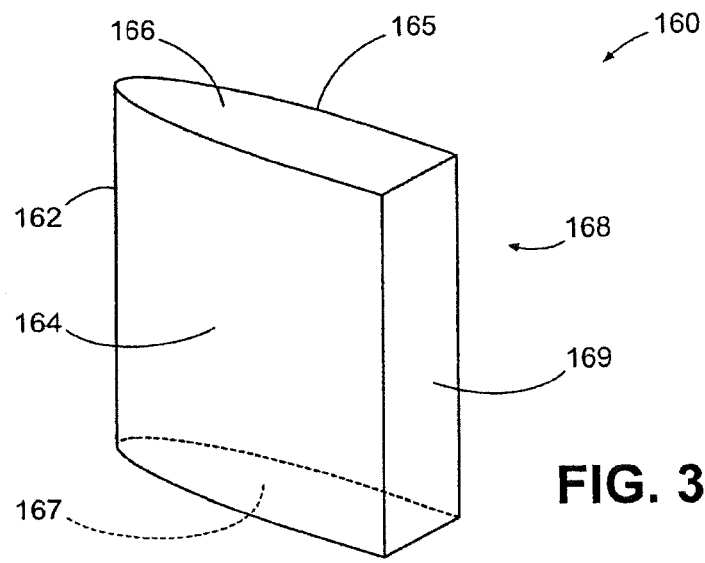
FIG. 3 is a schematic diagram depicting another exemplary embodiment of a locating component.

Gas turbine engine systems involving fairings with locating data are provided, several exemplary embodiments of which will be described in detail. In some embodiments, locating components are provided that establish desired spacing between fairing sheaths and the struts that extend through the sheaths. Typically, the locating components are positioned in a vicinity of the leading edges of the struts and can be used to form a crumple zone for protecting downstream struts. In some embodiments, one or more locating components can be used in a fairing to create a hollow cavity between the fairing sheath and a strut.

In this regard, reference is made to the schematic diagram of FIG. 1, which depicts an exemplary embodiment of a gas turbine engine. As shown in FIG. 1, engine 100 is depicted as a turbojet that incorporates a compressor section 102, a combustion section 104 and a turbine section 106. Additionally, a fairing assembly 110 (in this case, an inlet fairing assembly) is positioned upstream of the compressor section. Although depicted as a turbojet gas turbine engine, it should be understood that the concepts described herein are not limited to use with turbojets as the teachings may be applied to other types of gas turbine engines.

Fairing assembly 110 includes multiple fairings (e.g., fairing 112) that extend about an axis 114. As will be described in more detail with respect to FIG. 2, fairing 112 includes a fairing sheath 116, a locating component 118 and a strut 120. Notably, as shown in FIG. 1, locating component 118 extends along a length of the fairing.

As shown in FIG. 2, locating component 118 is positioned between fairing sheath 116 and strut 120. Specifically, the locating component is positioned in a channel 130 formed by the interior surface 132 of the fairing sheath in a vicinity of the leading edge 134 of the fairing sheath.

Locating component 118 is generally wedge-shaped in cross-sectional view, and incorporates a leading edge 142, sides 144, 146 extending from the leading edge, and an aft portion 148. Datum surfaces 150, 152 and 154 define a recess 156 positioned along the aft portion. In the embodiment of FIG. 2, a leading edge portion 159 of strut 120 (a portion of which is shown in dashed lines) contacts datum surface 150 to establish a desired orientation of the strut and fairing sheath. Notably, contact between the strut and the locating component sets a desired axial spacing between the interior surface 132 of the fairing sheath and the strut, particularly in a vicinity of leading edge 134. Additionally, the sides 144, 146 of the locating component function as guides for the fairing sheath as the sheath extends aft from the leading edge and about at least a portion of the strut. In some embodiments, the fairing sheath can be adhered to the locating component.

Another exemplary embodiment of a locating component is depicted schematically in FIG. 3. As shown in FIG. 3, locating component 160 is generally wedge-shaped although various other shapes can be used in other embodiments. Locating component 160 includes a leading edge 162, sides 164, 165 extending from the leading edge, opposing ends 166, 167, and an aft portion 168. Aft portion 168 includes a generally planar datum surface 169 that interconnects the sides and ends of the locating component. In operation, the datum surface 169 is used as a reference surface for positioning a fairing sheath in a desired orientation about one or more struts that are to be positioned within the cavity formed by the fairing sheath.

In this embodiment, locating component 160 is formed of thermal plastic material, although various other materials can be used in other embodiments. Selection of the one or more materials used to form the locating component can be based on one or more of various factors, such as durability, bondability and heat resistance, for example. In some embodiments, a thermal plastic such as polyamide-imide can be used.

Figure 4:
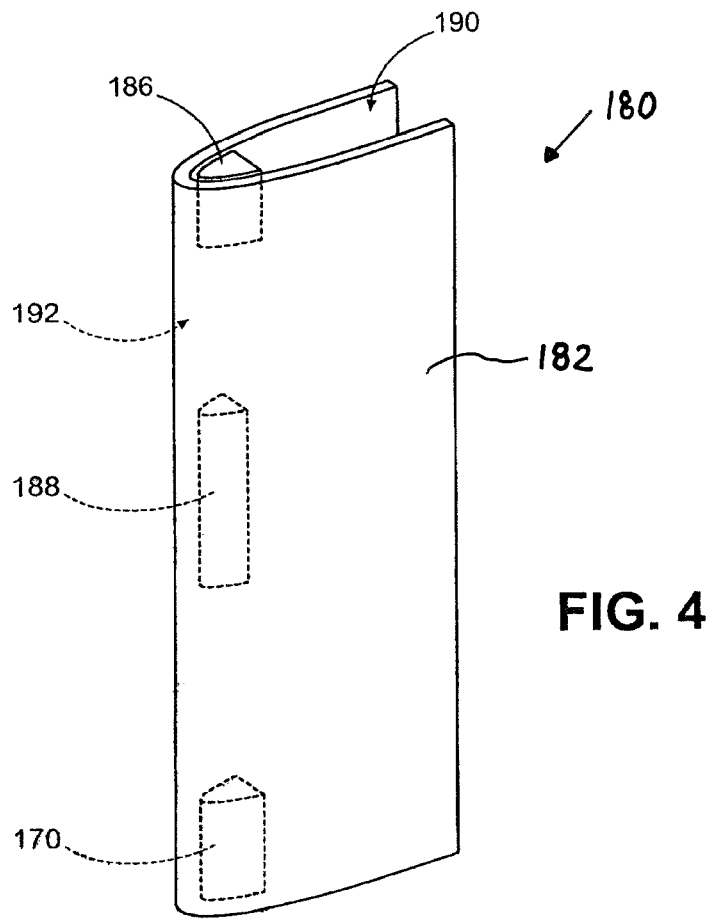
FIG. 4 is a schematic diagram depicting another exemplary embodiment of a fairing that includes multiple locating components.

FIG. 4 is a schematic diagram depicting another exemplary embodiment of a fairing. In contrast to the embodiment of FIGS. 1 and 2, this embodiment includes multiple locating components. Specifically, fairing 180 includes a fairing sheath 182 and locating components 170, 186 and 188. Notably, the locating components, in addition to assisting in orienting the fairing sheath relative to a strut (not shown), are spaced from each other to form cavities within channel 190. In some embodiments, the cavities (e.g., cavity 192) can be used for routing various components, such as wiring and fluid conduits, for example.

It should also be noted that the locating components exhibit differences in size and shape. For instance, component 188 is relatively long and narrow, whereas component 186 is relatively short and wide. In some embodiments, selection of the materials, sizes and/or shapes of the locating components as well as the positions of the location components can be used to alter characteristics, such vibratory modes of the fairing. As such, the selection and/or placement of one or more locating components can be used to tune a vibratory mode of a fairing.

It should be emphasized that the above-described embodiments are merely possible examples of implementations set forth for a clear understanding of the principles of this disclosure. Many variations and modifications may be made to the above-described embodiments without departing substantially from the spirit and principles of the disclosure. All such modifications and variations are intended to be included herein within the scope of this disclosure and protected by the accompanying claims.

The invention claimed is:

1. A fairing assembly for a gas turbine engine comprising:
a fairing sheath having an exterior surface and an interior surface, the exterior surface having a leading edge and being configured to form at least a portion of an exterior of the fairing, the interior surface defining a channel;
a strut extending through the channel;
a first locating component having a first datum surface, the first locating component being located between a portion of the strut and a portion of the interior surface of the fairing sheath such that the first datum surface establishes a desired orientation of the fairing sheath relative to the strut;
wherein the first locating component is located at a first position along a length of the fairing sheath; and
wherein the fairing further comprises a second locating component located at a second position along the length of the strut and between a second portion of the strut and a second portion of the interior surface of the fairing sheath such that the second locating component establishes a desired orientation of the fairing sheath relative to the strut in a vicinity of the second locating component.

2. The fairing of claim 1, wherein the first locating component contacts the interior of the fairing sheath at a location adjacent to the leading edge such that the first locating component establishes a distance between the leading edge and the strut.

3. The fairing of claim 1, wherein the second locating component is spaced from the first locating component such that the first locating component does not contact the second locating component.

4. The fairing of claim 1, wherein a portion of the interior surface of the fairing sheath is adhered to a portion of the strut.

5. The fairing of claim 4, wherein the portion of the interior surface of the fairing sheath is adhered to the first locating component.

6. The fairing of claim 1, wherein at least one of the first locating component or the second locating component is operative to tune a vibratory mode of the fairing.

7. The fairing of claim 1, wherein at least one of the first locating component or the second locating component comprises thermal plastic.

8. The fairing of claim 7, wherein at least one of the first locating component or the second locating component comprises polyamide-imide.

9. A fairing assembly for a gas turbine engine comprising:
a fairing sheath having an exterior surface and an interior surface, the exterior surface having a leading edge and being configured to form at least a portion of an exterior of the fairing, the interior surface defining a channel;
a strut extending through the channel;
a first locating component having a first datum surface, the first locating component being located between a portion of the strut and a portion of the interior surface of the fairing sheath such that the first datum surface establishes a desired orientation of the fairing sheath relative to the strut;
wherein the first locating component has the first datum surface located on an aft portion thereof;
wherein an upstream portion of the strut contacts the first datum surface to establish a desired spacing between the interior of the fairing sheath and the strut; and
wherein the first datum surface defines a portion of a recess.

10. The fairing of claim 9, wherein:
the recess is further defined by a second datum surface extending from the first datum surface and a third datum surface extending from the first datum surface; and
the second datum surface and the third datum surface contact corresponding portions of the strut.

11. The fairing of claim 9, wherein the first locating component contacts the interior of the fairing sheath at a location adjacent to the leading edge such that the first locating component establishes a distance between the leading edge and the strut.

12. The fairing of claim 9, wherein the second locating component is spaced from the first locating component such that the first locating component does not contact the second locating component.

13. The fairing of claim 9, wherein a portion of the interior surface of the fairing sheath is adhered to a portion of the strut.

14. The fairing of claim 13, wherein the portion of the interior surface of the fairing sheath is adhered to the first locating component.

15. The fairing of claim 9, wherein at least one of the first locating component or the second locating component is operative to tune a vibratory mode of the fairing.

16. The fairing of claim 9, wherein at least one of the first locating component or the second locating component comprises thermal plastic.

17. The fairing of claim 16, wherein at least one of the first locating component or the second locating component comprises polyamide-imide.

18. A gas turbine engine comprising:
   a compressor;
   a combustion section located downstream of the compressor;
   a turbine operative to drive the compressor; and
   a fairing assembly having a fairing sheath, a strut and a first locating component, the fairing sheath having an exterior surface and an interior surface, the exterior surface having a leading edge and being configured to form at least a portion of an exterior of the fairing, the interior surface defining a channel;
   the strut extending through the channel;
   the first locating component being located between a portion of the strut and a portion of the interior surface of the fairing sheath such that the first locating component establishes a desired orientation of the fairing sheath relative to the strut;
   wherein the first locating component is located at a first position along a length of the fairing sheath; and
   wherein the fairing further comprises a second locating component located at a second position along the length of the strut and between a second portion of the strut and a second portion of the interior surface of the fairing sheath such that the second locating component establishes a desired orientation of the fairing sheath relative to the strut in a vicinity of the second locating component.

19. The engine of claim 18, wherein:
   the first locating component has a first datum surface located aft of the leading edge; and
   the first datum surface contacts the strut to establish the desired orientation.

20. The engine of claim 18, wherein the fairing assembly is an inlet fairing assembly located upstream of the compressor.

* * * * *